(12) United States Patent
Matsuno et al.

(10) Patent No.: US 8,164,681 B2
(45) Date of Patent: Apr. 24, 2012

(54) IMAGE PICKUP APPARATUS

(75) Inventors: Katsumi Matsuno, Kanagawa (JP); Akira Hirai, Nara (JP); Nobumitsu Suzuki, Osaka (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 12/416,497

(22) Filed: Apr. 1, 2009

(65) Prior Publication Data

US 2009/0268048 A1     Oct. 29, 2009

(30) Foreign Application Priority Data

Apr. 23, 2008   (JP) ................. 2008-112232

(51) Int. Cl.
*H04N 5/232* (2006.01)
*G06K 9/00* (2006.01)
*G03B 13/08* (2006.01)
(52) U.S. Cl. ............................ 348/345; 382/103; 396/89
(58) Field of Classification Search ............... 348/222.1, 348/333.05, 345, 353; 382/103; 396/89
See application file for complete search history.

(56) References Cited

U.S. PATENT DOCUMENTS

| | | | | |
|---|---|---|---|---|
| 2002/0149689 A1 * | 10/2002 | Sannoh et al. | ........... | 348/333.02 |
| 2006/0012702 A1 * | 1/2006 | Kawahara et al. | ........... | 348/345 |
| 2008/0036900 A1 * | 2/2008 | Nakajima et al. | ........... | 348/345 |
| 2009/0129672 A1 * | 5/2009 | Camp et al. | ........... | 382/173 |

FOREIGN PATENT DOCUMENTS

JP        2008-15476        1/2008

* cited by examiner

*Primary Examiner* — Trung Diep
(74) *Attorney, Agent, or Firm* — Oblon, Spivak, McClelland, Maier & Neustadt, L.L.P.

(57) ABSTRACT

An image pickup apparatus includes an image pickup device configured to capture an image regarding an object image; an object detector detecting a specific object in the captured image; an image-capturing-information obtaining unit obtaining image capturing information from a predetermined area set in an image capturing area; a determiner determining whether or not the image capturing information regarding the specific object is obtainable from the predetermined area; and a display controller controlling a position display shown on a display unit, the position display indicating a position of the specific object. The display controller changes a display mode of the position display in accordance with the result of the determination performed by the determiner.

9 Claims, 8 Drawing Sheets

IMAGE PICKUP APPARATUS

BACKGROUND OF THE INVENTION

1. Field of the Invention

The present invention relates to a display technique for use in an image pickup apparatus.

2. Description of the Related Art

In a single-lens reflex image pickup apparatus, an object is generally observed through an optical finder. However, another type of image pickup apparatus has also been proposed which has an electronic finder function for displaying an object on a monitor as a moving image.

An example of an image pickup apparatus having the electronic finder function successively captures auxiliary images regarding an object image with an auxiliary image pickup device included in a finder optical system, and displays a live view based on the auxiliary images on a monitor. Some image pickup apparatuses that are capable of displaying the live view have a function of detecting specific objects in the live view image and displaying the positions of the specific objects on the monitor.

In general, a single-lens reflex image pickup apparatus includes an AF module for receiving object light to detect focus information (distance measurement information) of the object. The AF module outputs a phase-difference detection signal, which is used in an autofocus (AF) operation using a phase-difference detection method (see, for example, Japanese Unexamined Patent Application Publication No. 2008-15476).

The image pickup apparatus having the above-described function displays the positions of the detected specific objects on the monitor and allows a user to select one of the specific objects as a subject of distance measurement.

SUMMARY OF THE INVENTION

The phase-difference detection signal output from the AF module is generated on the basis of light from the object in predetermined areas (AF areas) set in an image capturing area. Therefore, if there is no AF area at positions where the specific objects are detected, the distance measurement information regarding the specific objects is unobtainable.

Therefore, if there is no AF area at the position of the specific object selected by the user, it is difficult to set the selected specific object as a subject of distance measurement.

This problem occurs not only when the distance measurement information is to be obtained but also when other image capturing information regarding a desired specific object is to be obtained from a predetermined area set in the image capturing area.

Accordingly, it is desirable to provide an image pickup apparatus capable of preventing a user from selecting a specific object for which the image capturing information is unobtainable in the process of selecting a specific object for which the image capturing information is to be obtained.

An image pickup apparatus according to an embodiment of the present invention includes an image pickup device configured to capture an image regarding an object image; object detecting means for detecting a specific object in the captured image; image-capturing-information obtaining means for obtaining image capturing information from a predetermined area set in an image capturing area; determining means for determining whether or not the image capturing information regarding the specific object is obtainable from the predetermined area; and display control means for controlling a position display shown on a display unit, the position display indicating a position of the specific object. The display control means changes a display mode of the position display in accordance with the result of the determination performed by the determining means.

An image pickup apparatus according to another embodiment of the present invention includes an image pickup device configured to capture an image regarding an object image; object detecting means for detecting a specific object in the captured image; image-capturing-information obtaining means for obtaining image capturing information from a predetermined area set in an image capturing area; and display control means for controlling a position display shown on a display unit, the position display indicating a position of the specific object. The display control means changes a display mode of the position display in accordance with the positional relationship between an area corresponding to the predetermined area and the specific object in the captured image.

According to the embodiments of the present invention, a specific object for which the image capturing information is unobtainable is prevented from being selected in the process of selecting a specific object for which the image capturing information is to be obtained.

DESCRIPTION OF THE PREFERRED EMBODIMENTS

Embodiments of the present invention will be described below with reference to the accompanying drawings.

1. First Embodiment

Structure

Figure 1:
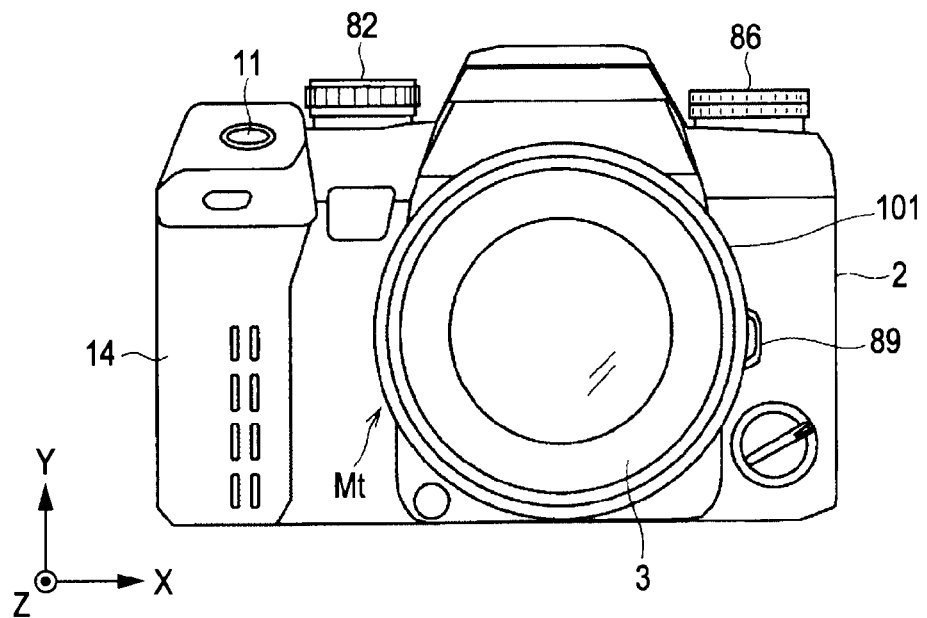
FIG. 1 is a diagram illustrating the external structure of an image pickup apparatus according to a first embodiment of the present invention.
Figure 2:
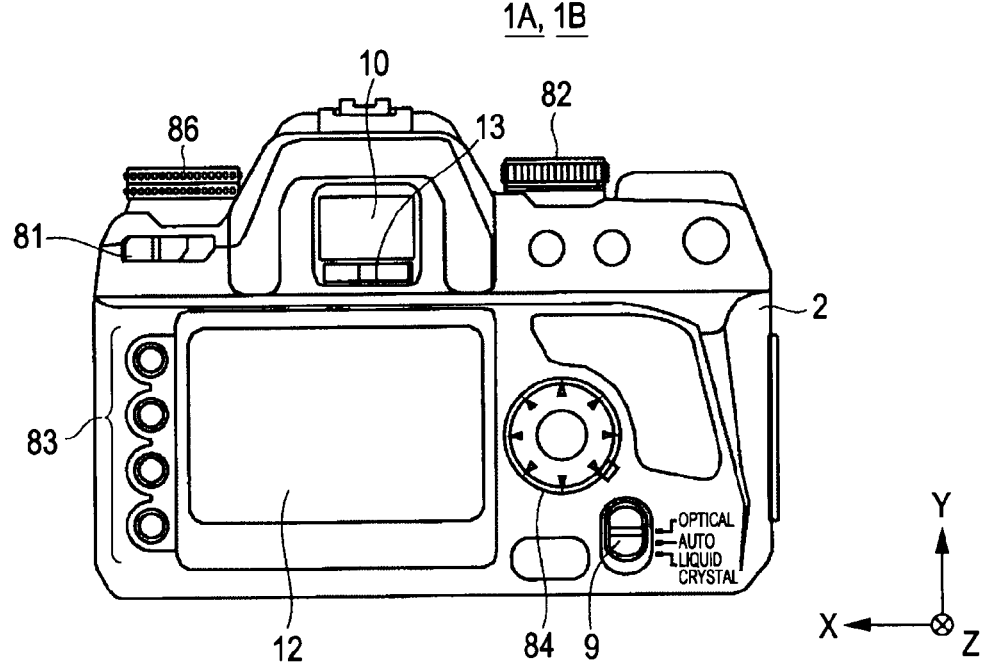
FIG. 2 is another diagram illustrating the external structure of the image pickup apparatus according to the first embodiment of the present invention.

FIGS. 1 and 2 are diagrams illustrating the external view of an image pickup apparatus 1A according to a first embodiment of the present invention. FIG. 1 is an external front view of the image pickup apparatus 1A. FIG. 2 is an external rear view of the image pickup apparatus 1A. The image pickup apparatus 1A is a single-lens reflex digital camera having a replaceable lens.

As shown in FIG. 1, the image pickup apparatus 1A includes a camera main body (camera body) 2. A replaceable image-capturing lens unit (replaceable lens) 3 is detachably attached to the camera main body 2.

The image-capturing lens unit 3 basically includes a barrel 101, a lens group 37 (see FIG. 3) disposed in the barrel 101, and an aperture stop (not shown). The lens group 37 includes a focusing lens which moves along an optical axis to change a focus position.

The camera main body 2 has an annular mount portion Mt to which the image-capturing lens unit 3 is attached at a central position on the front. A release button 89 for detaching the image-capturing lens unit 3 is provided near the annular mount portion Mt.

The camera main body 2 has a mode-setting dial 82 at an upper left position on the front and a control-value-setting dial 86 at an upper right position on the front. The mode-setting dial 82 is operated to set (switch between) various modes (image-capturing modes including a portrait mode, a landscape mode, and a continuous image-capturing mode, a playback mode for playing back the captured images, a communication mode for communicating data with external apparatuses, etc.). The control-value-setting dial 86 is operated to set control values used in the respective image-capturing modes.

The camera main body 2 includes a grip portion 14 that can be gripped by a user at the left end on the front. A release button (shutter button) 11 for issuing a command to start exposure is provided on a top surface of the grip portion 14. A battery-accommodating chamber and a card-accommodating chamber are provided in the grip portion 14. The battery-accommodating chamber accommodates, for example, four AA batteries as a power source for the camera. The card-accommodating chamber accommodates a recording medium (a memory card 90 (see FIG. 5) in this example) in a detachable manner. The memory card 90 stores data of captured images.

The release button 11 is capable of detecting two states thereof: a half-pressed state (S1) and a fully pressed state (S2). When the release button 11 is pressed halfway and the state S1 is detected, preparation operations for capturing a still image of the object to be stored are performed. For example, an AF control operation and an AE control operation are performed as preparation operations. When the release button 11 is further pressed and the state S2 is detected, an image-capturing operation for capturing the image to be stored is performed. In the image-capturing operation, an exposure operation for the object image is performed using an image pickup device (also referred to as a "main image pickup device") 5 (described below) and an image signal obtained by the exposure operation is subjected to image processing.

Referring to FIG. 2, a monitor 12 is provided as a display unit at a central position on the back of the camera main body 2. The monitor 12 includes, for example, a color liquid crystal display (LCD). The monitor 12 displays a menu screen used for setting image-capturing conditions and the like. In addition, in the playback mode, the monitor 12 shows a playback display of captured images stored in the memory card 90.

A finder window 10 is provided at an upper central position on the back of the camera main body 2. The object image obtained from the image-capturing lens unit 3 is guided to the finder window 10. The user can visually check an image that is equivalent to the object image captured by the main image pickup device 5 by looking through the finder window 10. More specifically, the object image incident on an image-capturing optical system is reflected upward by a mirror mechanism 6 (see FIG. 3) and is viewed by the user through an eyepiece 67. Thus, the user can determine the composition by looking through the finder window 10. When the state S2 of the release button 11 is detected and the image-capturing operation for capturing the image to be stored is started, the mirror mechanism 6 is removed from an optical path of the light which forms the object image. Accordingly, the light (light which forms the object image) from the image-capturing lens unit 3 reaches the main image pickup device 5 and an image (image data) of the object can be obtained.

A proximity sensor 13 is provided below the finder window 10. The proximity sensor 13 detects the presence of a nearby object, and is used to determine whether or not the finder is being used by the user.

A main switch 81 is provided at an upper left position of the monitor 12. The main switch 81 is a two-position slide switch. The power of the image pickup apparatus 1A is turned off when the main switch 81 is moved left to an OFF position, and is turned on when the main switch 81 is moved right to an ON position.

A direction selection key 84 and a display switch 9 are provided on the right of the monitor 12. The direction selection key 84 includes an annular operation button and is capable of individually detecting pressing operations of the operation button at four positions including top, bottom, left and right positions, and another four positions including upper left, upper right, lower left, and lower right positions. In addition to the above-described pressing operations at the eight positions in total, the direction selection key 84 can also detect a pressing operation of a push button provided at the center.

The display switch 9 is a three-position slide switch. When the display switch 9 is at a position indicated as "OPTICAL" at the top, an optical view finder (OVF) mode is selected and the object image is displayed in the field of view of the optical finder. Accordingly, the user can perform the composition determination operation (also referred to as a "framing" operation) while visually checking the object image in the field of view of the optical finder through the finder window 10.

When the display switch 9 is at a position indicated as "LIQUID CRYSTAL" at the bottom, an electronic view finder (EVF) mode is selected and a live view image of the object image is displayed on the monitor 12 as a moving image (live view display). Accordingly, the user can perform the flaming operation while visually checking the live view image displayed on the monitor 12.

In addition, when the display switch 9 is at a position indicated as "AUTO" in the middle, switching between the display in the field of view of the optical finder (also referred to as "OVF view") and the live view is automatically performed depending on whether or not the user is looking through the finder window 10. Accordingly, the user can perform the flaming operation while visually checking the display in the field of view of the optical finder or the display of the live view in accordance with the manner in which the image pickup apparatus 1A is used.

A setting button group 83 including a plurality of buttons for setting the menu screen, deleting images, etc., is provided on the left of the monitor 12.

Figure 3:
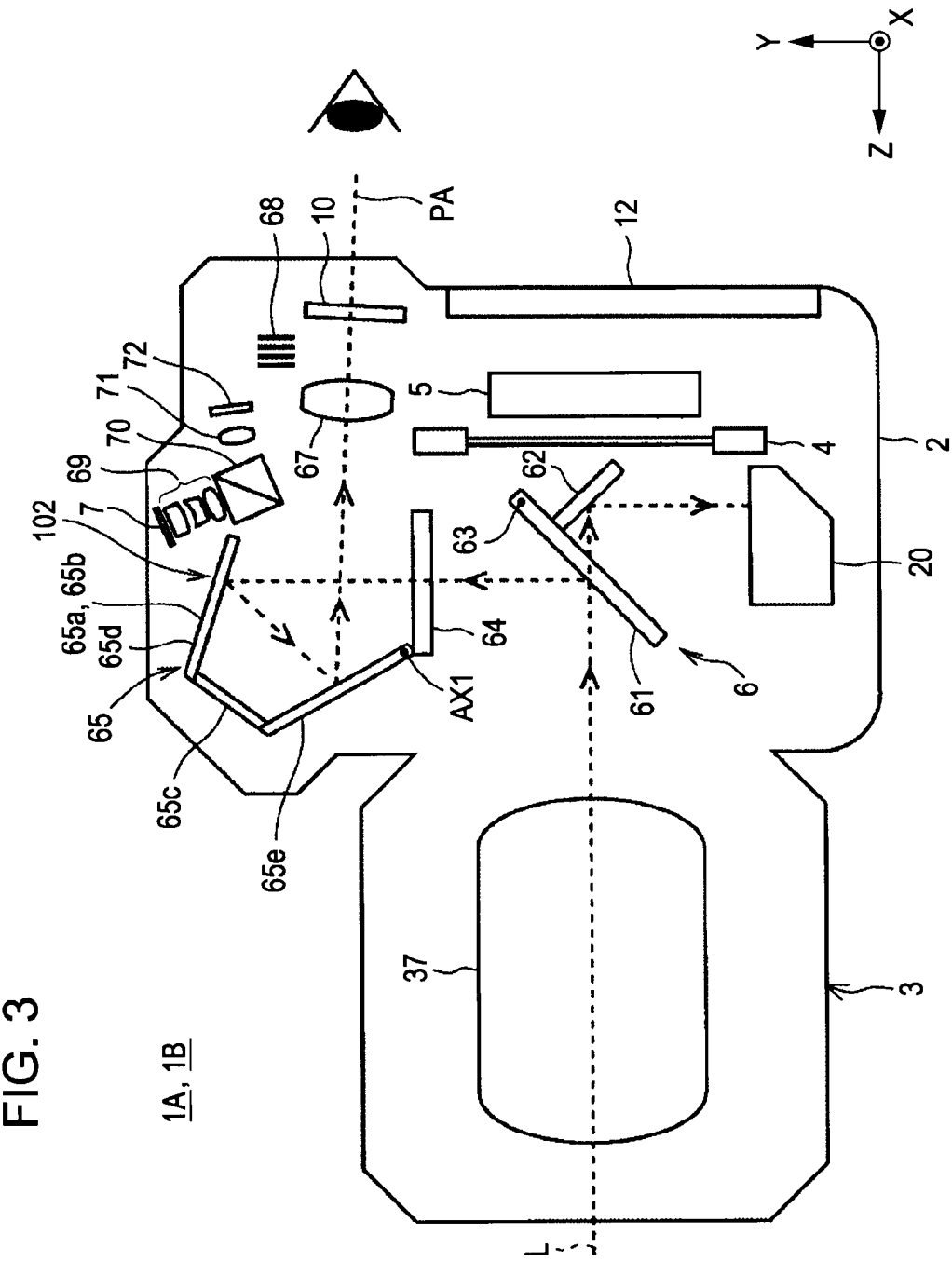
FIG. 3 is a vertical sectional view of the image pickup apparatus according to the first embodiment.
Figure 4:
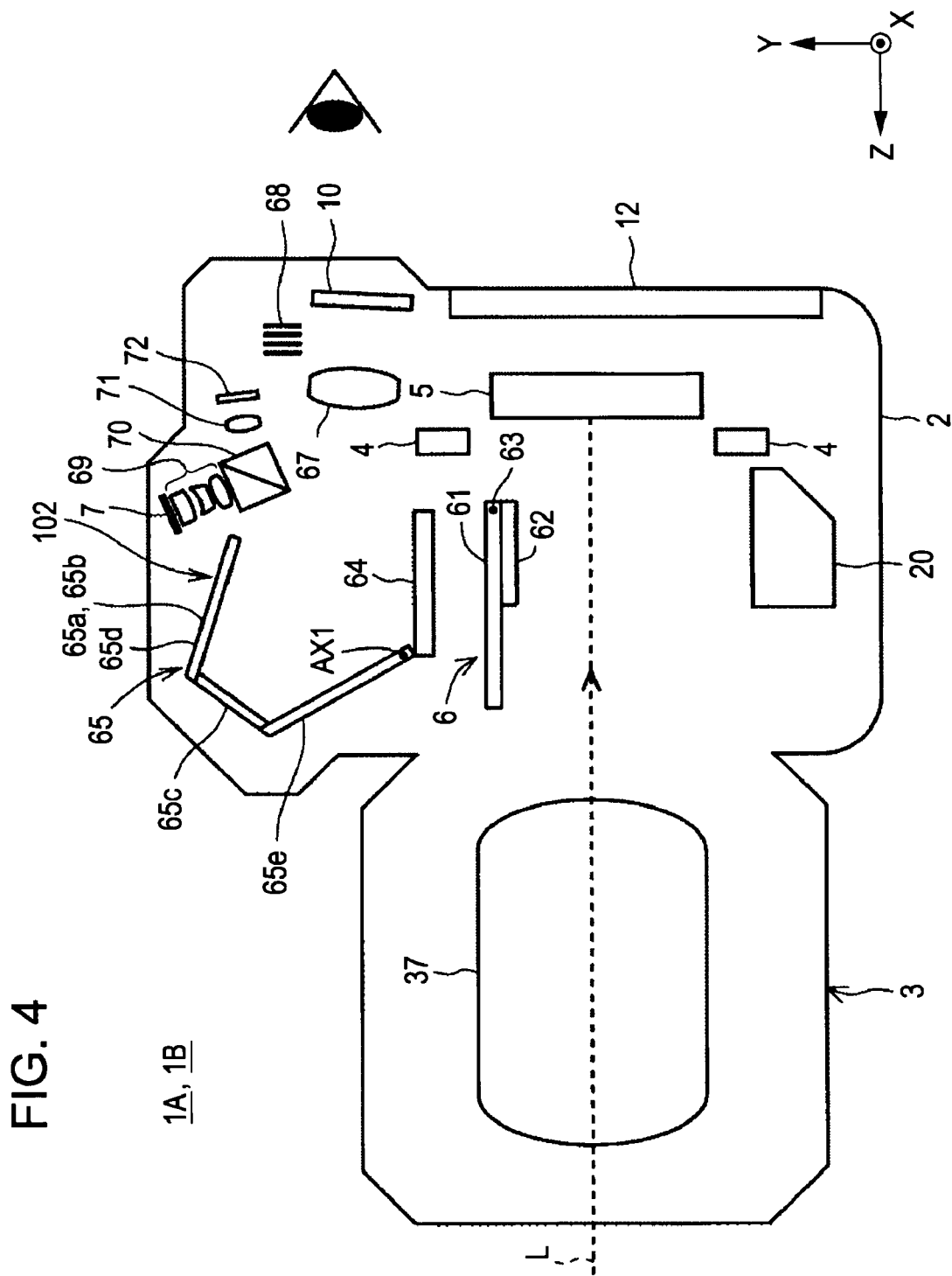
FIG. 4 is another vertical sectional view of the image pickup apparatus according to the first embodiment.

Next, the inner structure of the image pickup apparatus 1A will be described. FIGS. 3 and 4 are vertical sectional views of the image pickup apparatus 1A according to the first embodiment.

As shown in FIG. 3, the image pickup apparatus 1A includes a finder unit (also referred to as a "finder optical system") 102, the mirror mechanism 6, a phase-difference AF module (hereinafter also referred to simply as an AF module) 20, a shutter 4, the main image pickup device 5, and a sub image pickup device 7.

The main image pickup device (CCD sensor (also referred to simply as CCD) in this example) 5 is disposed on an optical axis L of a lens group 37 included in the image-capturing lens unit 3, and is arranged along a plane perpendicular to the optical axis L. The main image pickup device 5 receives an object image at an imaging surface thereof, and converts the received object image into an electric signal by photoelectric conversion. Thus, an image signal of the image to be stored is generated.

The shutter 4 is disposed immediately in front of the main image pickup device 5. The shutter 4 is a mechanical focal plane shutter which includes curtain members which move in the vertical direction, and performs an operation of opening and closing an optical path of the object light guided to the main image pickup device 5 along the optical axis L.

In addition, as shown in FIG. 3, the mirror mechanism 6 is provided on the optical path (also referred to as an "image capturing optical path") between the image-capturing lens unit 3 and the main image pickup device 5.

The mirror mechanism 6 includes a main mirror 61 (main reflective surface) for reflecting light from the image-capturing optical system upward. A portion or the entire body of the main mirror 61 is a half mirror that allows a part of the light from the image-capturing optical system to pass therethrough. The mirror mechanism 6 also includes a sub mirror 62 (sub reflective surface) for reflecting light that passes through the main mirror 61 downward.

The mirror mechanism 6 is formed as a so-called quick return mirror, and the position of the mirror mechanism 6 can be changed between a position in a mirror-down state and a position in a mirror-up state.

More specifically, in an image-capturing mode, the mirror mechanism 6 is set to the mirror-down state (see FIG. 3) until the state of the release button 11 is changed to the fully pressed state S2, in other words, while the composition determination operation is being performed. In the mirror-down state, the object light from the image-capturing lens unit 3 is reflected upward by the main mirror 61 and is incident on the finder unit (also referred to as a "finder optical system") 102 as observation light. The detailed structure of the finder unit 102 will be described in detail below.

A part of the object light passes through the main mirror 61, is reflected downward by the sub mirror 62, and is guided to the AF module 20.

The AF module 20 includes a line sensor (focus detection sensors) or the like which detects the focus information (also referred to as "distance measurement information") of the object, and functions as an AF sensor. More specifically, the AF module 20 has a phase-difference detection function of receiving the object light from distance measurement areas (also referred to as "focus areas" or "AF areas") set in the image capturing area and generating a phase-difference detection signal corresponding to the focus state of the object image. In other words, in the mirror-down state set in the standby period, the AF module 20 outputs the phase-difference detection signal on the basis of the object light guided to the AF module 20.

Thus, the AF module 20 functions as an image-capturing-information obtaining unit for obtaining the distance measurement information from the AF areas, which are set at fixed positions in the image capturing area, as image capturing information.

When the state of the release button 11 is changed to the fully pressed state S2, the mirror mechanism 6 is set to the mirror-up state (see FIG. 4) and the exposure operation is started.

More specifically, as shown in FIG. 4, the mirror mechanism 6 is lifted upward around a rotation axis 63 an is removed from the image capturing optical path during the exposure operation. In more detail, the main mirror 61 and the sub mirror 62 are moved upward so as not to block the light from the image-capturing optical system. The light from the image-capturing lens unit 3 reaches the main image pickup device 5 in synchronization with the time at which the shutter 4 is opened. The main image pickup device 5 generates an image signal of the object image based on the received light by photoelectric conversion. Thus, the object image can be captured (image data can be obtained) by guiding the light from the object to the main image pickup device 5 through the image-capturing lens unit 3.

Functional Blocks

Figure 5:
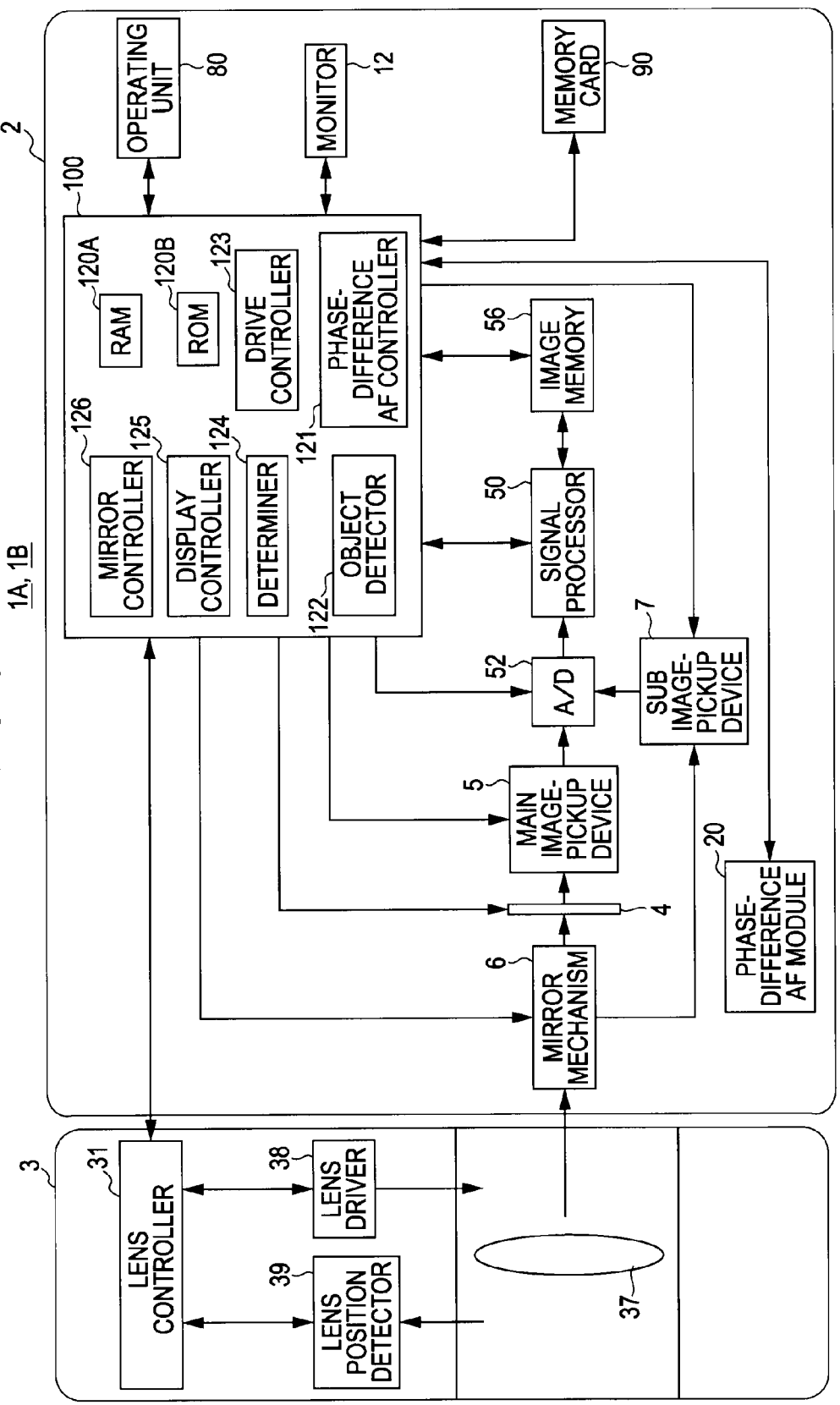
FIG. 5 is a block diagram illustrating the functional structure of the image pickup apparatus according to the first embodiment.

Functions of the image pickup apparatus 1A will now be described. FIG. 5 is a block diagram illustrating the functional structure of the image pickup apparatus 1A according to the first embodiment.

As shown in FIG. 5, the image pickup apparatus 1A includes the phase-difference AF module 20, an operating unit 80, an overall controller 100, the mirror mechanism 6, the shutter 4, the image pickup device 5, an A/D converter circuit 52, a digital signal processor circuit 50, and an image memory 56.

The operating unit 80 includes various switches and buttons including the release button 11 (see FIG. 1). The overall controller 100 performs various operations in response to an input operation performed by the user using the operating unit 80.

The main image pickup device 5 receives drive control signals (an accumulation start signal and an accumulation stop signal) from a timing control circuit (not shown), and performs an exposure operation (charge accumulation performed by causing photoelectric conversion) for an object image formed on a light-receiving surface (imaging surface) in response to the received drive control signals. As a result, an image signal corresponding to the object image is obtained.

The image signal (analog signal) obtained by the main image pickup device 5 is converted into a digital signal by the A/D converter circuit 52. The thus-obtained digital image signal is input to the digital signal processor circuit 50.

The digital signal processor circuit 50 subjects the image signal input from the A/D converter circuit 52 to digital signal processes. More specifically, a black-level correction process, a white balance (WB) process, a $\gamma$ correction process, etc., are performed. After the signal processes, the image signal (image data) is stored in the image memory 56.

The image memory 56 is a high-speed-accessible image memory for temporarily storing the generated image data and has a capacity large enough to store data of a plurality of frames of images.

In the image-capturing operation for capturing an image to be stored, the image data that is temporarily stored in the image memory 56 is subjected to image processing (for example, compressing process) by the overall controller 100 as necessary, and is then stored in the memory card 90.

The sub image pickup device 7 basically has a function similar to that of the main image pickup device 5, and serves as an image pickup device (auxiliary image pickup device) for capturing a live view image (for electronic finder). More specifically, the sub image pickup device 7 performs an exposure operation for an object image guided to the finder optical system, and obtains an image signal regarding an image to be displayed as a live view image. It is not necessary that the sub image pickup device 7 have a high resolution as long as an image signal for displaying the live view image can be generated. Therefore, the number of pixels in the sub image pickup device 7 is generally smaller than the number of pixels in the main image pickup device 5.

The image data obtained by the sub image pickup device 7 is subjected to predetermined processes by the A/D converter circuit 52 and the digital signal processor circuit 50. Then, the thus-processed data is temporarily stored in the image memory 56 and is displayed on the monitor 12.

The overall controller 100 is formed of a microcomputer, and basically includes a CPU, a RAM 120A, and a ROM 120B. The overall controller 100 reads programs stored in the ROM 120B and causes the CPU to execute the programs, thereby carrying out various functions.

The overall controller 100 executes the above-mentioned programs to carry out the functions of a phase-difference AF controller 121, an object detector 122, a drive controller 123, a determiner 124, a display controller 125, and a mirror controller 126.

The phase-difference AF controller 121 performs an autofocus (AF) operation (also referred to as a "phase-difference AF operation") by the phase-difference AF method. More specifically, the phase-difference AF controller 121 performs a lens-focus-position determination operation for determining the position (lens focus position) of the image taking lens (to be more specific, the focusing lens) in a focused state on the basis of the phase-difference detection signal output from the AF module 20.

In addition, the phase-difference AF controller 121 operates in association with the drive controller 123 to perform a lens-driving operation for moving the image taking lens (focusing lens) to the determined lens focus position.

More specifically, the phase-difference AF controller 121 transmits a control signal to a lens controller 31 included in the image-capturing lens unit 3 via the drive controller 123. Accordingly, the lens driver 38 is driven so as to move the focusing lens included in the lens group 37 in the image-capturing lens unit 3 along an optical axis. The position of the focusing lens is detected by a lens position detector 39 included in the image-capturing lens unit 3, and data representing the position of the focusing lens is transmitted from the lens controller 31 to the overall controller 100 in the camera main body 2.

The object detector 122 performs an object detection operation for detecting a specific object in an image (auxiliary image) captured by the sub image pickup device 7. In this example, a human face (also referred to as a "face area") is set as the specific object, and a face detection operation for detecting a face area in the auxiliary image is performed.

The face area may be detected by, for example, the following method. That is, first, a skin-colored area is extracted from the captured image on the basis of the pixel value of each pixel. Then, if the area of the extracted skin-colored area is equal to or larger than a predetermined threshold, it is determined that the skin-colored area is a human face. Alternatively, a human face may also be detected by extracting specific parts, such as eyes and a mouth, of a human face from the captured image by a common pattern recognition method. A face of an animal, such as a cat and a dog, may also be set as a specific object.

Whether or not to execute the above-described face detection operation is determined on the basis of an operation (menu operation) performed by a user on a menu screen. More specifically, when a face detection function (object detection function) is enabled (activated) by the menu operation, the face detection operation is performed in the EVF mode. If the face detection function is disabled (inactivated) by the menu operation, the face detection operation is not performed.

Among the images successively captured by the sub image pickup device 7, the face detection operation is performed using every several frames of images (also referred to as "face detection images"). In other words, the face detection operation is performed once for several frames.

The determiner 124 determines whether or not the image capturing information can be obtained for the specific object detected by the object detection operation. When, for example, distance measurement information regarding the specific object is to be obtained as the image capturing information, the determiner 124 determines whether or not the AF operation can be performed when the specific object is set as a subject of distance measurement.

The display controller 125 controls display contents shown on a display unit including the monitor 12. For example, the display controller 125 causes the monitor 12 to display continuous images on the basis of the images that are continuously captured by the sub image pickup device 7.

The mirror controller 126 controls the operation of switching between the state in which the mirror mechanism 6 is removed from the optical path (mirror-up state) and the state in which the mirror mechanism 6 blocks the optical path (mirror-down state). The mirror controller 126 switches between the mirror-up state and the mirror-down state by driving a mirror switch motor (not shown).

Composition Determination Operation (Framing Operation)

Figure 6:
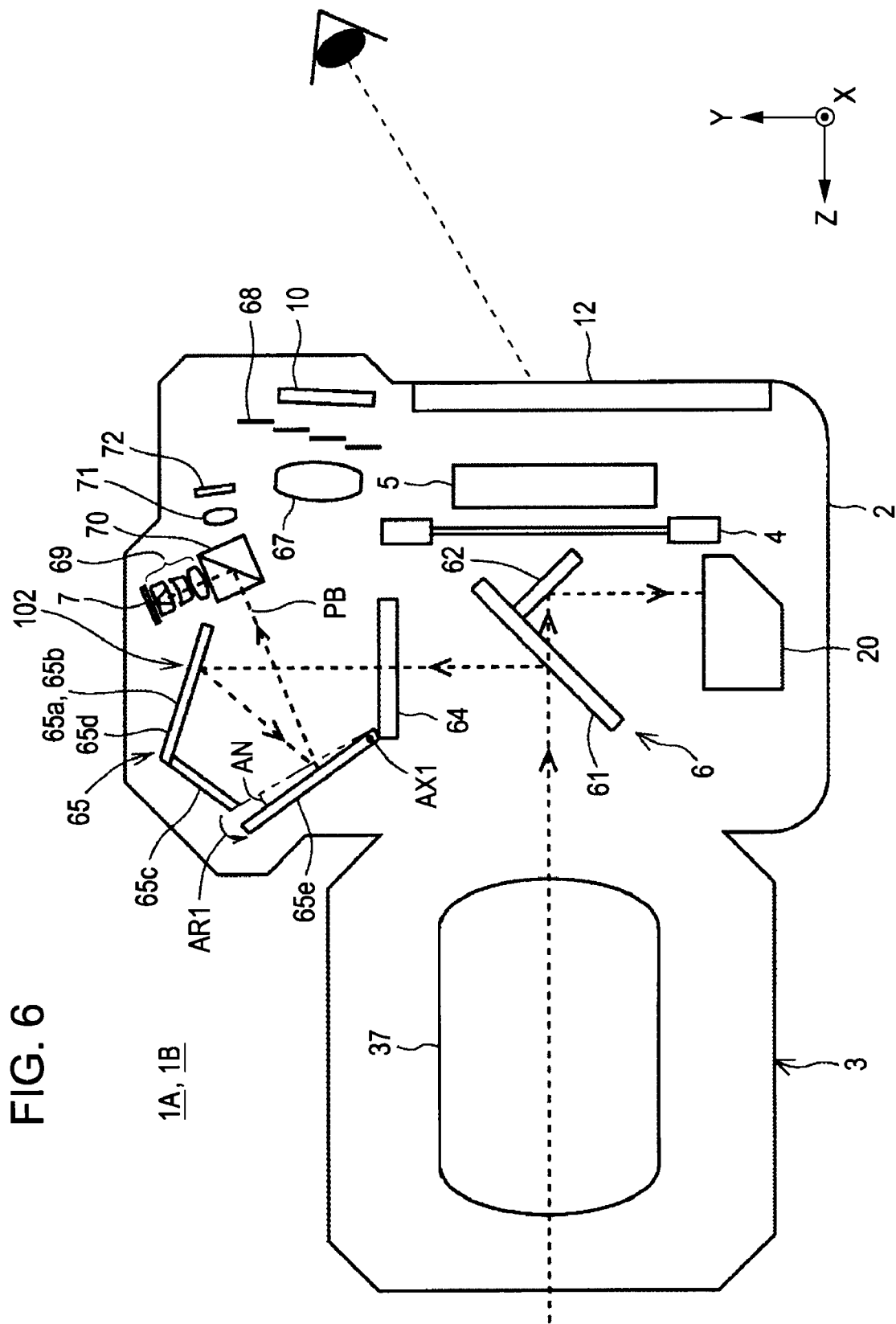
FIG. 6 is a vertical sectional view of the image pickup apparatus in an EVF mode.

The composition determination operation performed in the image pickup apparatus 1A will now be explained. As described above, in the image pickup apparatus 1A, the user can slide the display switch 9 to select whether to perform the composition determination operation using the optical finder in the OVF mode or to perform the composition determination operation using the electronic finder in the EVF mode. FIG. 6 is a vertical sectional view of the image pickup apparatus 1A in the EVF mode.

In the composition determination operation, the mirror mechanism 6 is set to the mirror-down state (see FIGS. 3 and 6). As described above, in the mirror-down state, the object image from the image-capturing lens unit 3 is reflected upward by the main mirror 61 and is guided to the finder unit 102 as observation light.

The finder unit 102 includes a penta-mirror 65, the eyepiece 67, an eyepiece shutter 68, the finder window 10, a beam splitter 70, the sub image pickup device 7, and a photometer 72.

The penta-mirror 65 includes a plurality of mirrors (reflective surfaces), and has a function of reflecting the object image such that an erect image is obtained by vertically and horizontally reversing the object image and a function of changing the optical path of the object light.

More specifically, the penta-mirror 65 includes two roof mirrors 65a and 65b arranged in the form of a delta roof, a surface 65c fixed to the roof mirrors (roof surfaces) 65a and 65b, and an optical-path changing mirror (reflective surface) 65e.

The roof mirrors 65a and 65b are formed as an integral component 65d by plastic molding and have a function of reflecting the object light twice so as to reverse the object image. The optical-path changing mirror 65e has a function of changing the optical path of the object light depending on whether the composition determination operation is performed using the optical finder or the electronic finder.

The eyepiece 67 has a function of guiding the erect object image obtained by the penta-mirror 65 to the outside of the finder window 10.

The eyepiece shutter 68 is disposed between the eyepiece 67 and the finder window 10. The eyepiece shutter 68 functions as a shutter capable of switching between a light blocking state in which the external light is prevented from entering the image pickup apparatus 1A through the finder window 10 and a non-blocking state in which the external light that enters through the finder window 10 is not blocked. For example, the eyepiece shutter 68 is set to the light blocking state in the EVF mode and is set to the non-blocking state in the OVF mode.

The beam splitter 70 has a function of dividing the optical path of the object light incident on the beam splitter 70 into two optical paths. The sub image pickup device 7 is disposed on one of the two optical paths of the object light, and the photometer 72 is disposed on the other one of the two optical paths of the object light.

The photometer 72 receives the object light that passes through the beam splitter 70 and an imaging lens 71, and performs a photometry process. More specifically, the photometer 72 receives the object light from photometry areas (also referred to as "AE areas") set in the image capturing area and obtains photometry information (for example, object brightness information) regarding the amount of light of the object image. The photometry information obtained by the photometer 72 is used, for example, to set an exposure (AE) control value.

Thus, the photometer 72 functions as an image-capturing-information obtaining unit for obtaining the photometry information from the AE areas, which are set at fixed positions in the image capturing area, as image capturing information.

Figure 7:
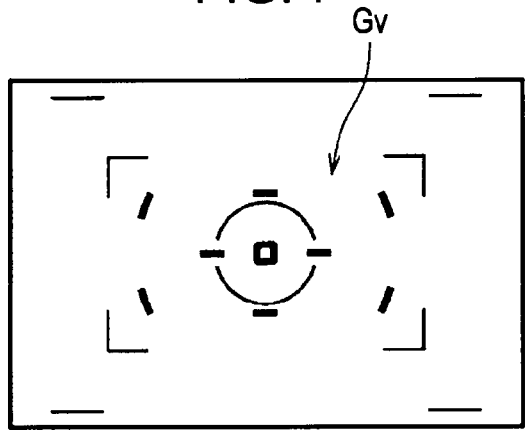
FIG. 7 is a diagram illustrating line images displayed in a finder window.
Figure 8:
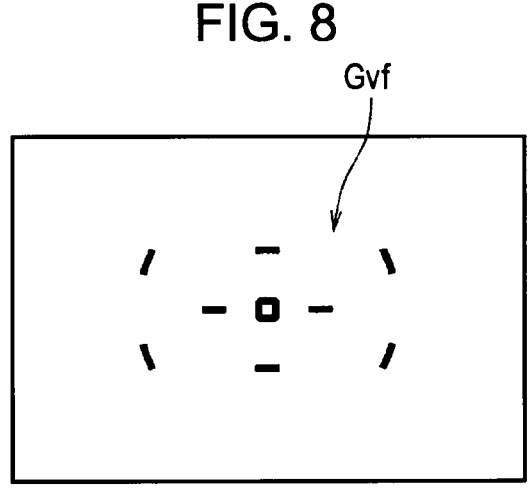
FIG. 8 is a diagram illustrating line images indicating AF areas.

The flaming operation using the optical finder and the flaming operation using the electronic finder will now be described in detail. FIG. 7 is a diagram illustrating line images Gv shown in the finder window 10. FIG. 8 is a diagram illustrating line images Gvf indicating the AF areas.

First, the flaming operation using the optical finder will be described.

As shown in FIG. 3, in the OVF mode, the mirror mechanism 6 is disposed on the optical path of the object image from the image-capturing lens unit 3, and the object image is guided to the finder window 10 through the main mirror 61, the penta-mirror 65, and the eyepiece 67. Thus, the main mirror 61 and the finder optical system 102 including the penta-mirror 65 and the eyepiece 67 are capable of guiding the object image obtained by the image-capturing optical system to the finder window 10.

More specifically, the object light that passes through the image-capturing lens unit 3 is reflected upward by the main mirror 61 and is focused on a focusing glass 64. The object light focused on the focusing glass 64 passes through the focusing glass 64 and is incident on the penta-mirror 65, which changes the optical path of the object light. Then, the object light passes through the eyepiece 67 and travels toward the finder window 10 (see an optical path PA in FIG. 3). Thus, the object image is guided to the finder window 10 along the optical path PA and reaches an eye of the user (observer), so that the user can visually check the object image.

Thus, in the OVF mode, the user can determine the composition while visually checking the object image by looking through the finder window 10.

As shown in, for example, FIG. 7, in the optical finder, the line images (also referred to as "line drawings" or "target marks") Gv, which indicate focusing positions and/or photometry positions with respect to the object, are superimposed on the object image in the finder window 10. The line images Gv include a plurality of line images corresponding to image capturing conditions regarding the focusing operation and/or the exposure operation.

In the image pickup apparatus 1A, the focus detection sensors included in the AF module 20 are disposed at positions corresponding to nine line images Gvf (see FIG. 8) in the line images Gv shown in FIG. 7. The nine line images Gvf indicate the AF areas in the image capturing area at which the focus information can be obtained. In the image pickup apparatus 1A, the object can be brought into focus by using the focus detection sensors provided at the nine AF areas.

The line images Gv are drawn by scratching the top surface of the focusing glass 64, which is formed as a transparent component. Thus, the line images Gv, which are superimposed on the object image and guided to the finder window 10, are drawn on the focusing glass 64 disposed on the optical path PA which guides the object light from the image taking lens to the finder window 10.

Next, the flaming operation using the electronic finder will be described.

As shown in FIG. 6, also in the EVF mode, the mirror mechanism 6 is disposed on the optical path of the object image from the image-capturing lens unit 3. The object light that passes through the image-capturing lens unit 3 is reflected upward by the main mirror 61 and is focused on the focusing glass 64. The object light focused on the focusing glass 64 passes through the focusing glass 64 and is incident on the penta-mirror 65, which changes the optical path of the object light. The optical path is further changed by the beam splitter 70 so that the object light passes through an imaging lens 69 (imaging optical system) and is re-focused on the imaging surface of the sub image pickup device 7 (see the light path PB in FIG. 6).

Thus, in the EVF mode, the object image is guided to the sub image pickup device 7 along an optical path PB, which is different from the optical path PA used in the OVF mode.

In the finder unit 102, the optical path is changed by changing the angle (installation angle relative to the camera main body 2) of the optical-path changing mirror 65e in accordance with the finder mode.

More specifically, the optical-path changing mirror 65e is rotatable around an axis AX1 in response to a sliding movement of the display switch 9. In the EVF mode (see FIG. 6), the optical-path changing mirror 65e is rotated from the position thereof in the OVF mode (see FIG. 3) by a predetermined angle AN around the axis AX1 in the direction shown by arrow AR1.

The overall controller 100 determines whether to perform the composition determination operation using the optical finder or to perform the composition determination operation using the electronic finder on the basis of the result of detection obtained by an angle detector (not shown) which detects the angle of the optical-path changing mirror 65e around the axis AX1.

In the state shown in FIG. 3, it is determined from the angle of the optical-path changing mirror 65e that the composition determination operation is to be performed using the optical finder. Accordingly, processes of stopping the supply of electricity to the sub image pickup device 7 and turning off the monitor 12 are performed. In the state shown in FIG. 6, it is determined from the angle of the optical-path changing mirror 65e that the composition determination operation is to be performed using the electronic finder. Accordingly, processes corresponding to the EVF mode, that is, processes of supplying electricity to the sub image pickup device 7 and displaying a live view image on the monitor 12 are performed.

Thus, in the EVF mode, the position of the optical-path changing mirror 65e is changed so as to change the optical path of the object light in the finder unit 102. As a result, the object light passes through the beam splitter 70 and the imaging lens 69 and reaches the sub image pickup device 7.

As described above, the sub image pickup device 7 receives the object light which travels along the optical path PB and reaches the sub image pickup device 7, and periodically captures an image regarding the object image at a small time interval (for example, 1/60 seconds). The images captured in time series are successively displayed on the monitor 12 as a moving image (live view display).

Accordingly, the user can determine the composition while visually checking the moving image (live view image) displayed on the monitor 12.

The imaging lens 69, the beam splitter 70, and the sub image pickup device 7 are disposed at positions where they do not block the light which travels from the optical-path changing mirror 65e to the eyepiece 67 in the OVF mode (at positions above the eyepiece 67 in this embodiment).

Thus, in the image pickup apparatus 1A, switching between the OVF mode and the EVF mode is performed by changing the optical path of the object image by changing the position of the optical-path changing mirror 65e in the finder unit 102.

Monitor Display in EVF Mode

Figure 9:
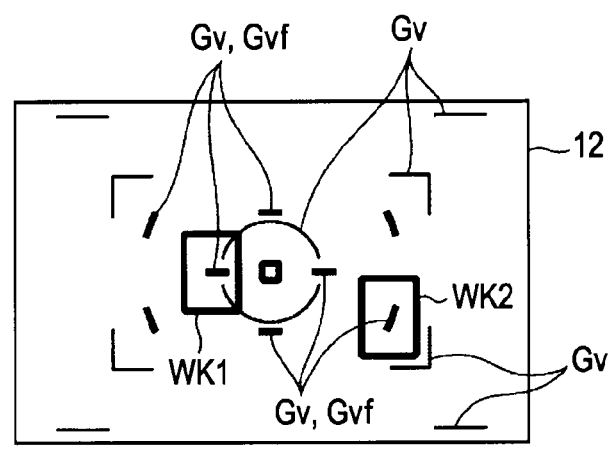
FIG. 9 is a diagram illustrating an example of a display on a monitor in the EVF mode.

The monitor display in the EVF mode will now be explained. FIG. 9 is a diagram illustrating an example of a display on the monitor 12 in the EVF mode. In FIG. 9, the object is not shown for simplicity.

As described above, in the EVF mode, the object is displayed on the monitor 12 as a moving image. In addition, as shown in FIG. 9, the line images Gv are also displayed on the monitor 12 together with the object (not shown in FIG. 9) in the EVF mode.

In addition, if the face detection function is enabled in the EVF mode and a face area is detected, a display (also referred to as a "face position display") indicating the position of the detected face area is also shown on the monitor 12. More specifically, in the case where the face detection function is enabled, if a person is included in the object image, the face of the person is detected and the position of the face is displayed on the monitor 12.

The position of the detected face is shown by a frame (hereinafter also referred to as a "face frame" or a "face display frame") which surrounds the detected face area. In FIG. 9, two face frames WK1 and WK2 are displayed. A display mode of the face frame WK on the monitor 12 differs depending on the positional relationship between the detected face area and the AF areas.

The face position display operation performed in the EVF mode will now be described with reference to the flowchart of the face position display operation shown in FIG. 10. FIG. 11 is a diagram illustrating face frames WK indicating faces detected by the face detection operation.

Figure 10:
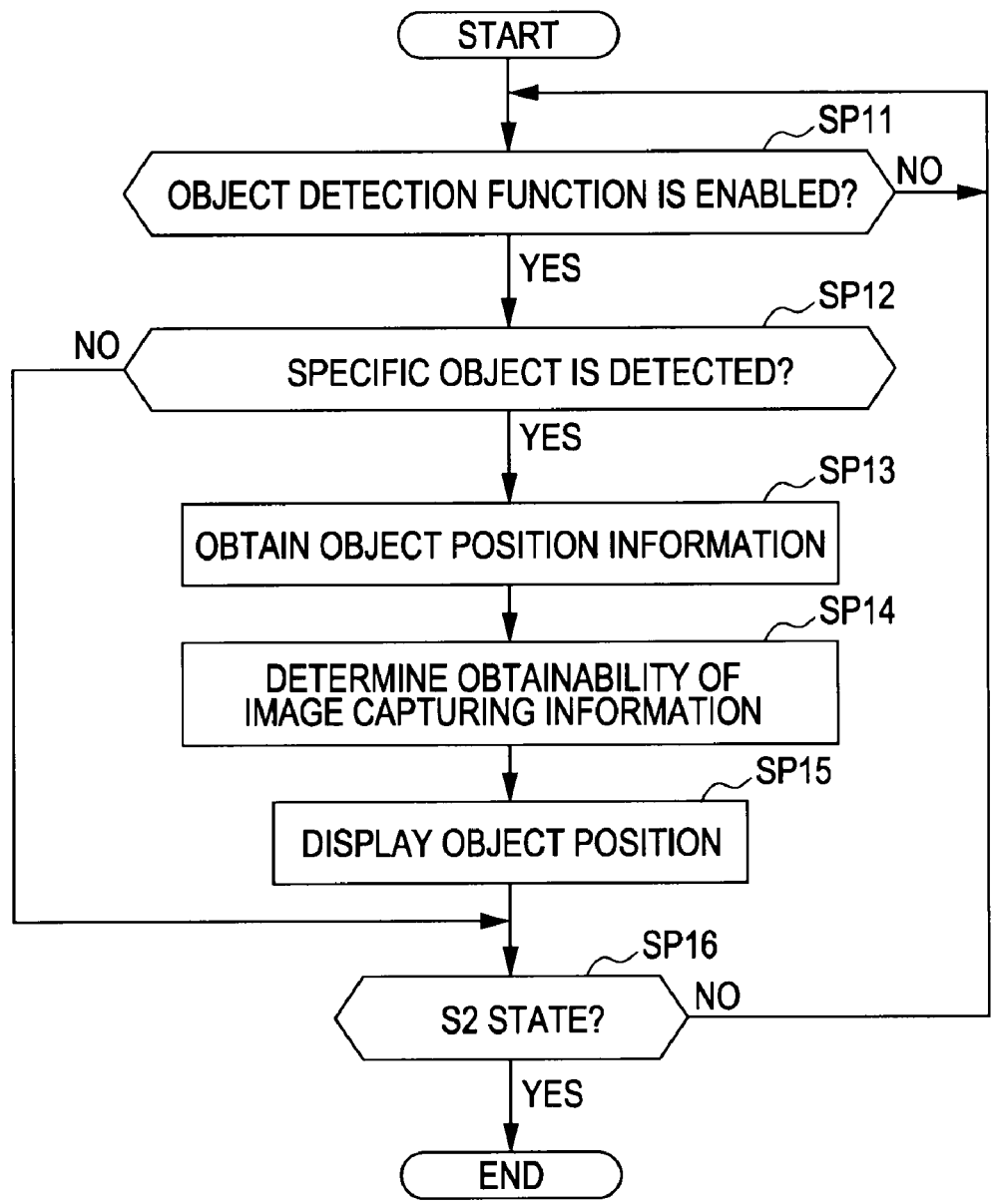
FIG. 10 is a flowchart of a face-position display operation.
Figure 11:
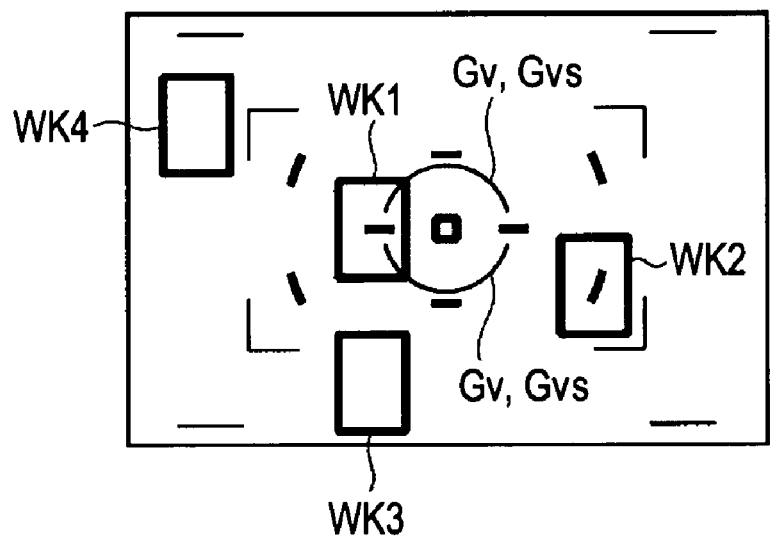
FIG. 11 is a diagram illustrating face frames indicating faces detected by a face detection operation.

In the image pickup apparatus 1A, the face position display operation shown in FIG. 10 is performed when the EVF mode is set.

More specifically, first, it is determined whether or not the object detection function (face detection function in this example) is enabled in step SP11. If it is determined that the object detection function is enabled, the process proceeds to step SP12. If it is determined that the object detection function is not enabled (disabled), the process waits until the object detection function is enabled.

In step SP12, it is determined whether or not a specific object is detected in the object detection operation. If a specific object is detected, the process proceeds to step SP13. If no specific object is detected, the process proceeds to step SP16.

In step SP13, information regarding the position of the specific object in the auxiliary image is obtained. More specifically, the coordinates of each pixel in the area of the specific object (also referred to as a "detected object area") in the auxiliary image are obtained.

Then, in step SP14, the determiner 124 determines whether or not the image capturing information regarding the specific object is obtainable.

When, for example, the distance measurement information regarding the specific object is to be obtained as the image capturing information, it is determined whether or not the specific object can be selected as the subject of distance measurement. More specifically, it is determined whether or not the detected object area overlaps any one of AF areas on the auxiliary image (also referred to as "corresponding AF areas" or "equivalent AF areas"), which correspond to the AF areas set in the image capturing area.

Whether or not the detected object area overlaps any one of the corresponding AF areas on the auxiliary image can be determined by, for example, the following method. That is, the coordinates of each pixel in the corresponding AF areas are compared with the coordinates of each pixel in the detected object area. Thus, it is determined whether or not at least some of the pixels in the corresponding AF areas are included in the detected object area.

The coordinates of each pixel in the corresponding AF areas on the auxiliary image are obtained at the time when the image pickup apparatus 1A is manufactured, and are stored in the ROM 120B of the image pickup apparatus 1A in advance.

Thus, in step SP14, it is determined that the detected object area overlaps one or more of the corresponding AF areas on the auxiliary image if it is determined that at least some of the pixels in the corresponding AF areas are included in the detected object area. In such a case, it is determined that the image capturing information regarding the specific object can be obtained.

Referring to FIG. 10, in step SP15, the display controller 125 causes the monitor 12 to display the position of the detected specific object.

The display mode of the position on the monitor 12 differs depending on the result of the above-described determination of whether or not the detected object area is in the overlapping state.

For example, referring to FIG. 11, a case is considered in which four face areas are detected in the object detection operation (face detection operation). In FIG. 11, four face frames WK1 to WK4 are displayed. In this case, it is determined whether or not each of the four face areas overlaps the corresponding AF areas in step SP14.

As a result of the determination, the face areas (face frames WK3 and WK4 in FIG. 11) which do not overlap the corresponding AF areas and the face areas (face frames WK1 and WK2 in FIG. 11) which overlap the corresponding AF areas are determined.

Then, in step SP15, the face frames WK1 and WK2 indicating the face areas which overlap the corresponding AF areas are displayed on the monitor 12 while the face frames WK3 and WK4 indicating the face areas which do not overlap the corresponding AF areas are set to a non-display mode (see FIG. 9).

Thus, in the image pickup apparatus 1A, the positions of the face areas which overlap the corresponding AF areas are displayed but the positions of the face areas which do not overlap the corresponding AF areas are not displayed (are set to a non-display mode).

As described above, in the image pickup apparatus 1A, it is determined whether or not the image capturing information regarding the specific object can be obtained from a predetermined area set in the image capturing area. Then, the display mode of the position of the specific object is changed in accordance with the result of the determination. Accordingly, the user can determine whether or not the image capturing information regarding the specific object can be obtained from the predetermined area on the basis of the display mode of the position of the specific object. As a result, when a specific object for which the image capturing information is to be obtained is selected by the user, the user is prevented from selecting a specific object for which the image capturing information is unobtainable.

2. Second Embodiment

Next, a second embodiment of the present invention will be described.

Figure 12:
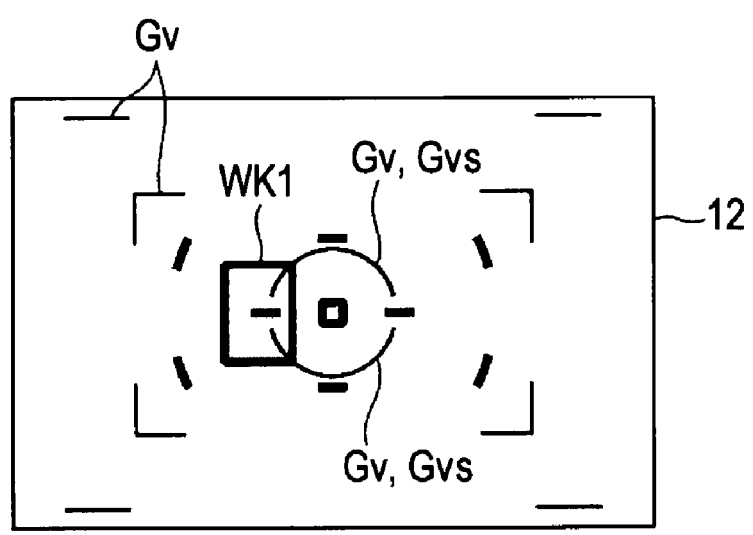
FIG. 12 is a diagram illustrating another example of a display on a monitor of the image pickup apparatus in the EVF mode.

In the image pickup apparatus 1A according to the first embodiment, the distance measurement information regarding the specific object is obtained as the image capturing information. However, in an image pickup apparatus 1B according to the second embodiment, photometry information regarding the specific object is obtained as the image capturing information. FIG. 12 is a diagram illustrating an example of a display on the monitor 12 in the image pickup apparatus 1B in the EVF mode.

The structure and functions of the image pickup apparatus 1B according to the second embodiment are similar to those of the image pickup apparatus 1A according to the first embodiment (see FIGS. 1 to 6) except the photometry information regarding the specific object is obtained as the image capturing information. In the second embodiment, components similar to those of the first embodiment are denoted by the same reference numerals, and explanations thereof are thus omitted.

The determiner 124 in the image pickup apparatus 1B determines whether or not a photometry process can be performed when the specific object detected in the object detection operation is a photometry subject, in other words, whether or not the specific object can be selected as the photometry subject.

The display mode of the face frame WK on the monitor 12 differs depending on the result of the determination performed by the determiner 124.

For example, referring to FIG. 11, a case is considered in which four face areas are detected in the object detection operation. In such a case, it is determined whether or not each of the four face areas overlaps photometry areas on the auxiliary image (also referred to as "corresponding photometry areas" or "equivalent photometry areas"), which correspond to photometry areas set in the image capturing area.

As a result of the determination, the face areas which do not overlap the corresponding photometry areas (face frames WK2, WK3, and WK4 which do not overlap line images Gvs indicating the photometry areas in FIG. 11) and the face area which overlaps the corresponding photometry areas (face frame WK1 in FIG. 11) are determined.

Then, the display controller 125 causes the monitor 12 to display the face frame WK1 indicating the face area which overlaps the corresponding photometry areas, and the face frames WK2, WK3, and WK4 indicating the face areas which do not overlap the corresponding photometry areas are set to a non-display mode (see FIG. 12).

Thus, in the image pickup apparatus 1B, the positions of the face areas which overlap the corresponding photometry areas are displayed but the positions of the face areas which do not overlap the corresponding photometry areas are not displayed (are set to a non-display mode). Accordingly, the positions of the face areas which can be selected as the photometry subject are shown in the monitor 12, while the positions of the face areas which are not selectable as the photometry subject are not displayed. As a result, the user is prevented from selecting a face area which is not selectable as the photometry subject.

3. Modifications

Although the embodiments of the present invention have been described, the present invention is not limited to the above-described embodiments.

For example, in each of the above-described embodiments, the position of each face area is indicated by the frame WK which surrounds the detected face area. However, the present invention is not limited to this.

For example, the position of the detected face area may also be indicated by an icon.

In addition, in each of the above-described embodiments, whether or not to display the position of the face area is determined in accordance with the result of the determination of whether or not the face area is in the overlapping state. However, the present invention is not limited to this.

For example, the face frame WK can be displayed in different colors, shapes, etc., in accordance with the result of the determination of whether or not the face area is in the overlapping state. More specifically, as a modification of the first embodiment, the positions of the face areas which overlap the corresponding AF areas may be indicated by face frames WK drawn by solid lines, and the positions of the face areas which do not overlap the corresponding AF areas may be indicated by face frames WK drawn by dashed lines. Alternatively, the display of the positions of the face areas which do not overlap the corresponding AF areas and the display of the positions of the face areas which overlap the corresponding AF areas can be distinguished from each other by causing the face frames WK indicating the face areas which do not overlap the corresponding AF areas to flash.

In addition, in the first embodiment, whether or not each specific object detected in the object detection operation can be selected as the subject of distance measurement is determined on the basis of whether or not the detected object area overlaps any one of the corresponding AF areas. However, the present invention is not limited to this.

For example, the eyes of the specific object may be detected in the object detection operation, and whether or not the specific object can be selected as the subject of distance measurement may be determined on the basis of whether or not there is a corresponding AF area within a certain distance from the eyes. In this case, it is determined that the specific object can be selected as the subject of distance measurement when there is an AF area within the certain distance from the eyes of the specific object.

In addition, there is a high possibility that a specific part (body in this example) is positioned below the face of a person. Therefore, it may also be determined that the specific object can be selected as the subject of distance measurement when an AF area is positioned below the face area detected as the specific object.

In addition, in the first embodiment, the focus information is obtained by the focus detection sensors included in the AF module 20. However, the present invention is not limited to this.

More specifically, pixels for phase difference detection (also referred to as "AF pixels") which are capable of obtaining the focus information may be provided on the light receiving surface of the main image pickup device 5 (or the sub image pickup device 7). In such a case, an automatic focusing operation by the phase-difference detection method (also referred to as a "phase-difference AF operation using an image pickup device") can be performed using output signals from the AF pixels.

In this case, the determiner 124 determines whether or not the detected object area overlaps the corresponding AF areas on the auxiliary image which correspond to the AF areas defined by the positions of the AF pixels, and the display mode of the position of the specific object is determined on the basis of the result of the determination.

The present application contains subject matter related to that disclosed in Japanese Priority Patent Application JP 2008-112232 filed in the Japan Patent Office on Apr. 23, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus, comprising:
 an image pickup device configured to capture an image regarding an object image;
 means for detecting a specific object in the captured image;
 means for obtaining image capturing information from a predetermined area set in an image capturing area;
 means for determining whether or not the image capturing information regarding the specific object is obtainable from the predetermined area;
 means for controlling a position display shown on a display unit, the position display indicating a position of the specific object; and
 means for auto-focusing the captured image based on the position display controlled by the means for controlling,
 wherein the means for controlling selects between a display mode and a non-display mode of the position display based on the result of the determination performed by the means for determining.

2. The image pickup apparatus according to claim 1, wherein the means for controlling sets the position display to the non-display mode when the means for determining determines that the image capturing information regarding the specific object is unobtainable from the predetermined area.

3. The image pickup apparatus according to claim 2, wherein the means for determining determines that the image capturing information regarding the specific object is obtainable when an area corresponding to the predetermined area and an area of the specific object overlap each other in the captured image.

4. The image pickup apparatus according to claim 3, wherein the predetermined area includes an AF area, and wherein the means for obtaining obtains distance measurement information from the AF area.

5. The image pickup apparatus according to claim 3, wherein the predetermined area includes an AE area, and wherein the image-capturing-information obtaining means obtains photometry information from the AE area.

6. The image pickup apparatus according to claim 1, wherein the means for controlling changes the display mode of the position display between a case in which the means for determining determines that the image capturing information regarding the specific object is unobtainable and a case in which the means for determining determines that the image capturing information regarding the specific object is obtainable.

7. An image pickup apparatus, comprising:
 an image pickup device configured to capture an image regarding an object image;
 means for detecting a specific object in the captured image;
 means for obtaining image capturing information from a predetermined area set in an image capturing area;
 means for controlling a position display shown on a display unit, the position display indicating a position of the specific object; and
 means for auto-focusing the captured image based on the position display controlled by the means for controlling,
 wherein the means for controlling selects between a display mode and a non-display mode of the position display based on the positional relationship between an area corresponding to the predetermined area and the specific object in the captured image.

8. An image pickup apparatus, comprising:
 an image pickup device configured to capture an image regarding an object image;
 an object detector detecting a specific object in the captured image;
 an image-capturing-information obtaining unit obtaining image capturing information from a predetermined area set in an image capturing area;
 a determiner determining whether or not the image capturing information regarding the specific object is obtainable from the predetermined area;
 a display controller controlling a position display shown on a display unit, the position display indicating a position of the specific object; and
 an auto-focuser auto-focusing the captured image based on the position display controlled by the display controller,
 wherein the display controller selects between a display mode and a non-display mode of the position display based on the result of the determination performed by the determiner.

9. An image pickup apparatus, comprising:
 an image pickup device configured to capture an image regarding an object image;
 an object detector detecting a specific object in the captured image;
 an image-capturing-information obtaining unit obtaining image capturing information from a predetermined area set in an image capturing area;
 a display controller controlling a position display shown on a display unit, the position display indicating a position of the specific object; and
 an auto-focusing unit that auto-focuses the captured image based on the position display controlled by the display controller,
 wherein the display controller selects between a display mode and a non-display mode of the position display based on the positional relationship between an area corresponding to the predetermined area and the specific object in the captured image.

* * * * *